United States Patent [19]

Barrett et al.

[11] 4,087,357

[45] May 2, 1978

[54] DESALINATION PROCESS USING THERMALLY REGENERABLE RESINS

[75] Inventors: James H. Barrett, Cornwells Heights; David H. Clemens, Willow Grove, both of Pa.

[73] Assignee: Rohm and Haas Company, Philadelphia, Pa.

[21] Appl. No.: 513,375

[22] Filed: Oct. 9, 1974

Related U.S. Application Data

[63] Continuation-in-part of Ser. No. 429,012, Dec. 27, 1973, abandoned.

[51] Int. Cl.$^2$ .................... B01D 15/04; B01D 15/06
[52] U.S. Cl. ............................................ 210/32
[58] Field of Search .................. 210/24, 30, 32, 37, 210/38; 260/2.1 R

[56] References Cited

U.S. PATENT DOCUMENTS

| 3,134,740 | 5/1964 | Sheetz | 260/2.1 R |
|---|---|---|---|
| 3,332,890 | 7/1967 | Hatch | 260/2.1 R |
| 3,351,549 | 11/1967 | Bloch | 210/32 |
| 3,663,467 | 5/1972 | Albright | 210/24 |
| 3,716,481 | 2/1973 | Battaerd | 210/32 |
| 3,839,237 | 10/1974 | Battaerd et al. | 210/32 |
| 3,843,566 | 10/1974 | Barrett | 210/37 |
| 3,875,085 | 4/1975 | Bolto | 260/2.1 R |

FOREIGN PATENT DOCUMENTS

| 728,508 | 4/1955 | United Kingdom. |
|---|---|---|
| 1,116,800 | 6/1968 | United Kingdom. |
| 124,114 | 2/1959 | U.S.S.R. |

*Primary Examiner*—Charles N. Hart
*Assistant Examiner*—Ivars Cintins
*Attorney, Agent, or Firm*—Louis F. Kline, Jr.

[57] ABSTRACT

A process for desalinating water containing mineral salts utilizes thermally regenerable hybrid resins. A preferred embodiment provides for the desalination of saline water using hybrid resins comprising per hundred parts of macroreticular host polymer, a guest phase ranging from 50 to 300 parts by weight.

17 Claims, No Drawings

DESALINATION PROCESS USING THERMALLY REGENERABLE RESINS

This is a continuation in part application of copending U.S. application Ser. No. 429,012 filed Dec. 27, 1973 now abandoned.

This invention concerns a process for desalinating liquids containing metal salts using thermally regenerable hybrid resins. The process includes regenerating the hybrid ion exchange resins by elution with an aqueous liquid having a temperature greater than that of the liquid at the time of the absorption phase.

Desalination of waters containing metal salts by ion exchange is not novel. For ecological reasons such desalination processes preferably include resins which are regenerated by other than chemical means. Frequently, however, processes that utilize these resins, such as for example thermally regenerable resins, exhibit low efficiencies caused by low thermal load capacity or high resin attrition rates. By thermal load capacity is meant the ability of a resin or resin system to absorb to elute an amount of metal salts at a specified pH and expressed in mille-equivalent of salt per mille liter of resin.

It is a primary object of this invention to provide a commercially economical desalination process employing thermally regenerable resins. It is a further object to provide a desalination process having effluents of improved purity. It is an additional objective to provide a desalinating process which provides excellent quality water.

It has now been discovered that certain hybrid resins when used in a desalination process satisfy the above mentioned objectives.

The process is effective for removing salts of metals such as Na, Al, K, Mn, Ca, Zn, Mg, Fe and Cu in combination with such anions as $Cl^-$, $NO_3^-$, $SO_4^{--}$, $HCO_3^-$ and $CO_3^{--}$. Nevertheless and without being limited thereto, the invention will be described in detail in relation to the desalination of saline waters. It should be realized however that the invention has many other obvious utilities such as preparation of potable water, treatment of surface or ground waters for industrial feed waters, home water conditioning and sugar liquor purification.

The process of the invention utilizes hybrid resins. Hybrid resins are defined in our copending application Ser. No. 26,046 filed Apr. 6, 1970, and may constitute a system made up of discrete weak acid and weak base resin particles. In general, the hybrid resins useful in the practice of the invention are prepared by filling a macroreticular copolymer, usually termed "host copolymer" with a crosslinked copolymer of a different nature termed a "guest copolymer." This process results in the location of one type of polymer in the pores and another type of polymer in the framework of the hybrid intermediate polymer. More specifically, the structure may be prepared by (1) stirring a macroreticular (MR) host polymer such as styrene-divinylbenzene (DVB) into a given quantity of water;

(2) adding to the resulting mixture a different monomer mixture, for example, a methacrylate-benzoyl peroxide-DVB solution which causes the organic liquid to be taken up by the host copolymer by capillary action, thus filling the voids of the host copolymer and (3) polymerizing the added solution thermally. The resulting hybrid polymer will comprise two different types of copolymer occupying separate and discrete regions within the copolymer. This intermediate hybrid copolymer is then chloromethylated. Basic aminolysis converts the chloromethyl groups and hydrolyses the ester linkages. The subsequent neutralization provides a hybrid resin which has distinct regions of differing functionality.

Hybrid resins are considerably different from so-called "snake cage resins" which contain closely associated acid and basic functionalities. "Snake-cage" resins have been used in the demineralization of sugar solutions and consist of amphoteric resins containing for example strong base groups such as quaternary ammonium groups or weak base group such as tertiary amine groups and nearby weak acid groups such as carboxylic groups in an intimate association. They are also sometimes known as "ampholytes" and absorb salt which may be subsequently be removed by elution with hot water. The ampholytes are prepared in general by impregnating an anion exchange resin with an acid monomer, which is then polymerized in situ to form long chains of linear polymer intertwined with anion exchange resin to form the so-called "snake cage" resin. However, because of the close proximity of the positively and negatively charged sites in such resins, there is a strong tendency of self-neutralization of the ionic charges due to ion pair formation so that there are relatively few charged sites which are sufficiently far apart for the absorption of salt to occur, resulting in a very low capacity of such resins. Furthermore, again because of the proximity of the exchange sites, it is necessary to have approximately equal parts of acid and basic sites, as a significant excess of one type of site will bring about repulsion of ions of the same charge entering the resin thus inhibiting the rate of salt uptake or elution. The present invention avoids all these disadvantages due to the greater distances between the different types of ionic functional groups after polymerization.

Another prior art process is commonly referred to as the mixed bed process. Mixed bed resin systems, as used originally featuring resin beads having diameters ranging from 300 to 1200 m have been examined for use as thermally regenerable resin in desalination processes. The resins composed of beads having such particle sizes suffer from a rate of salt uptake much too slow to allow these resins to perform economically. It was discovered that adequate resin utilization at acceptable flow rates could only occur if the resin beads would be reduced in particle sizes to have diameters of 10 to 20$\mu$m. The reduced particle size reduces the diffusion path for protons between the acid and base adsorption sites. Unfortunately the reduced particle size although providing for good kinetics causes severe mechanical problems. Due to the nature of the fine particle sized resin, the mechanical difficulties inherent in the handling and retention of the resin within the equipment have effectively precluded their utility in large scale commercial processes. Such fine absorbent beds not only create pressure drops, are prone to clogging and fouling, but they are extremely difficult to backwash effectively owing to the ease with which the fine particles become entrained with the backwashing liquor. These disadvantages become particularly apparent in continuous ion exchange processes where the liquor and the adsorbents must be intimately contacted at one stage but must be otherwise handled separately.

A preferred embodiment of the process utilizes influent concentrations of impurities of less than 1000 ppm.

However, the process will perform satisfactorily over a wide range of influent concentrations. The hybrid resins have different pH criteria for optimum thermal load capacity. The optimum operational pH and thermal load capacity is influenced by the ratio of filling levels of host polymer versus guest polymer as can be seen from the following tables. The skilled practitioner can prepare those hybrid resins best suited to the pH of the liquids to be treated. Although the hybrid resins when exhausted may be eluted or regenerated with aqueous solutions having a temperature exceeding the temperature of the adsorption stage, preferred temperatures of the regeneration stage, range between 80° – 110° C.

As mentioned above, the hybrid copolymers useful in the process of the invention may be prepared by adding a polymerizable monomer, a crosslinking agent, and a free radical initiator to a stirred mixture of a macroreticular host copolymer and water.

However, there are numerous techniques that can be used to prepare the hybrid copolymers and hybrid resins, which term, incidentally, has been coined to distinguish the copolymers useful in the practice of the present invention from the gel and macroreticular copolymers and resins of the prior art. The "hybrid" terminology indicates that the resins have some of the characteristics and/or properties of both gel and macroreticular copolymers and resins but, more importantly, they represent a class of materials having distinct proporties of their own. One general approach for preparing these copolymers is to at least partially fill the pores of a macroreticular copolymer or resin with guest copolymer utilizing varying percentages of crosslinking agent and introducing such guest copolymer, or guest copolymer forming components, in varying amounts. Alternatively, the hybrid copolymers can be prepared by filling the pores of a macroreticular copolymer with additional macroreticular copolymers in varying amounts and with varying crosslinker contents or percentages or by varying the amount of phase extender.

The base or host copolymer possesses a special porous structure which is referred to herein as macroreticular. Macroreticular copolymers possess a network of microscopic channels extending through the mass and while these microscopic channels are obviously very small, they are large in comparison with the pores in conventional homogeneous cross-linked gels, pores of the latter type not being visible in electron photomicrographs and, as is well known, not being true pores at all (vide Kunin, "Ion Exchange Resins" page 45, et seq. John Wiley & Sons, Inc. 1958). Typically, MR polymers have a surface area of at least 1 sq. meter per gram, and more generally at least 5 sq. meters per gram and have pores larger than about 15 to 20 A Units. It is conventional to produce these MR polymers in bead form, usually in an overall particle size of about 10 to 900 microns. Further information on the preparation and structure of macroreticular polymers, which are known materials, may be obtained by referring to British Patents 932,125 and 932,126 and U.S. Pat. Nos. 3,275,548 and 3,357,158.

The macroreticular and gel type copolymers and resins, per se, and the resins containing ion exchange functional groups have been described in the prior art. In general, similar types of monomeric materials are used in preparing the MR, and gel type resins, while the preparation process is varied to impart different characteristics, especially different porosity, to the different types of resins. In general, the backbone of these resins and thus the backbone of the hybrid resin as well, will be a cross-linked copolymer of (1) a polyunsaturated monomer, containing a plurality of non-conjugated $CH_2=C<$ groups, which acts as a cross-linking agent and (2) a monoethylenically unsaturated monomer, either aromatic or aliphatic. If desired one may use as host polymer a polymer based on vinyl benzyl chloride crosslinked with divinylbenzene rather than the more commonly known styrene-divinylbenzene MR polymer. A procedure to prepare such a resin is exemplified in Procedure V.

Suitable polyunsaturated cross-linking agents include divinylbenzene, divinyltoluenes, divinylnaphthalenes, diallyl phthalate, ethylene glycol diacrylate, ethylene glycol dimethacrylate, trimethylolpropane trimethacrylate, neopentyl glycol dimethacrylate, bis-phenol A dimethacrylate, pentaerythritol tetra and trimethacrylates, divinylxylene, divinylethylbenzene, divinylsulfone, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silicate, triallyl tricarballylate, triallyl aconitate, triallyl citrate, triallyl phosphate, N,N'-methylenediacrylamide, N,N'-methylene dimethacrylamide, N,N'-ethylenediacrylamide, trivinylbenzene, trivinylnaphthalene, polyvinylanthracenes and the polyallyl and polyvinyl ethers of glycol glycerol, pentaerythritol, resorcinol and the monothio or dithio derivatives of glycols.

Preferred cross-linking monomers for both the MR host copolymer and the guest fill include polyvinyl aromatic hydrocarbons, such as divinylbenzene and trivinylbenzene, glycol dimethacrylates and polymethacrylates, such as ethylene glycol dimethacrylate, trimethylolpropane trimethacrylate, and polyvinyl ethers of polyhydric alcohols, such as divinoxyethane and trivinoxypropane. The amount of crosslinking agent or monomer can be varied widely.

Suitable monoethylenically unsaturated monomers for both the macroreticular base or host copolymer and guest copolymer include esters of acrylic acid, such as methyl acrylate, ethyl acrylate, propyl acrylate, isopropyl acrylate, butyl acrylate, tert-butyl acrylate, ethylhexyl acrylate, cyclohexyl acrylate, isobornyl acrylate, benzyl acrylate, phenyl acrylate, alkylphenyl acrylate, ethoxymethyl acrylate, ethoxyethyl acrylate, ethoxypropyl acrylate, propoxymethyl acrylate, propoxyethyl acrylate, propoxypropyl acrylate, ethoxyphenyl acrylate, ethoxybenzyl acrylate, ethoxycyclohexyl acrylate, the corresponding esters of methacrylic acid, styrene, o-, m- and p-methyl styrenes, and o-, m-, and p-ethyl styrenes, dimethyl itaconate, vinyl naphthalene, vinyl toluene and vinylnaphthalene. A class of monomers of particular interest consists of vinyl aromatic monomers such as styrene and the esters of acrylic and methacrylic acid with $C_1$–$C_{10}$ aliphatic alcohol.

The polymerization reaction is generally carried out in the presence of a catalyst. Suitable catalysts which provide free radicals to function as reaction initiators include benzoylperoxide, t-butyl hydroperoxide, lauroyl peroxide, cumene hydroperoxide, tetralin peroxide, acetyl peroxide, caproyl peroxide, t-butyl perbenzoate, t-butyl diperphthalate, methyl ethyl ketone peroxide.

The amount of peroxide catalyst required is roughly proportional to the concentration of the mixture of monomers. The usual range is 0.01% to 5% by weight of catalyst with reference to the weight of the monomer mixture. The optimum amount of catalyst is determined in large part by the nature of the particular monomers selected, including the nature of the impurities which may accompany the monomers.

Another suitable class of free-radical generating compounds which can be used as catalysts are the azo catalysts, including for example, azodiisobutyronitrile, azodiisobutyramide, azobis($\alpha,\alpha$-dimethylvaleronitrile), azobis($\alpha$-methyl-butyronitrile), dimethyl, diethyl, or dibutyl azobis(methyl-valerate). These and other similar azo compounds, which serve as free radical initiators, contain an -N=N- group attached to aliphatic carbon atoms, at least one of which is tertiary. An amount of 0.01% to 2% of the weight of monomer or monomers is usually sufficient.

In making the guest gelular or MR copolymers and the hybrid copolymers and resins containing the quest copolymers and resins, a wide variety of polymerization conditions and processes well known in the art can be used. However, the preferred method is suspension polymerization in a liquid, such as water, which is not a solvent for the monomeric material. This method produces the polymer directly in the form of small spheroids or beads, the size of which can be regulated and controlled. By adjustments in the composition of the suspending medium and in the rate of agitation during polymerization, the suspension polymerization process can be made to produce spheroids or beads of a wide range of effective particle sizes.

In preparing the base macroreticular copolymer or resin, and likewise in preparing a hybrid copolymer or resin which may contain a macroreticular fill of lesser cross-linkage content, the polymerization reaction is carried out in the presence of a precipitant which is a liquid (a) which acts as a solvent for the monomer mixture and is chemically inert under the polymerization conditions and (b) which is present in such amount and which exerts so little solvating action on the product cross-linked copolymer that phase separation of the product copolymer takes place as evidenced by the fact that the product copolymer is no more than semi-transparent and is preferably opaque when associated with a fluid having a different refractive index.

The determination of the most effective precipitant and the amounts required for the formation of a particular copolymer may vary from case to case because of the numerous factors involved. However, although there is no "universal" or single class of precipitants applicable to all cases, it is not too difficult to determine which precipitants will be effective in a given situation. The requirements of solubility with the monomer mixture and low solvating action on the product copolymer can be tested empirically and the solubilities of many monomers and copolymers are well known from publications and textbooks. A swelling type solvent can be used, however, provided that the cross-linker level is sufficiently high.

As a further guide in the selection of a suitable precipitant, reference may be made to scientific literature, for instance, as discussed in Hildebrand and Scott, Solubility of Non-Electrolytes, 3d., N.Y., 1950. In general, it may be stated that sufficiently wide differences in the solubility parameters of copolymer and solvent, respectively, must exist for the precipitant to be effective and that, once an effective precipitant has been located, the behaviour of many other liquids can be predicted from the relative position of the reference polymer and precipitant in published tables, within the accuracy of such published information. Furthermore, if the solubility parameter of a given polymer occupies an intermediate position in these tables, solvents with both higher or lower parameters may become effective.

A minimum concentration of any particular precipitant is required to effect phase separation. This is comparable to the observation that many liquid systems containing two or more components are homogenous when some components are present in only minor amounts; but, if the critical concentration is exceeded, separation into more than one liquid phase will occur. The minimum concentration of the precipitant in the polymerizing mixture will have to be in excess of the critical concentration. The amounts in excess of such critical concentration can be varied and they will influence to some extent the properties of the product so formed.

Too high a concentration of the precipitant may be undesirable for practical reasons since the rate of copolymerization may decrease and the space-time yields become low. In many cases, the amount of precipitant employed may be between 25 percent and 60 percent by weight of the total weight of the monomer mixture and the precipitant.

The amount of precipitant liquid required to effect phase separation varies inversely with the degree of crosslinking of the copolymer so that the greater the cross-linker content, the lesser is the amount of precipitant employed.

As stated above, the chemical character of the precipitant may vary appreciably, depending on the monomer mixture which is used. When employing aromatic hydrocarbon type monomers, such as for instance, styrene and divinylbenzene, alkanols with a carbon atom content of from 4 to 10 will, if sufficient cross-linker is used, effect the desired phase separation when used in amounts of from about 30% to 50% of the total weight of monomers and precipitant.

Saturated aliphatic hydrocarbons containing at least 7 carbon atoms, such as heptane and isooctane, may be employed as precipitants for aromatic hydrocarbon systems, such as styrene and divinylbenzene. Also, cyclohexane may be employed. The amounts employed can be varied, depending on the degree of crosslinkage, from 30% to 50% of the total weight of the monomers and precipitant.

When employing acrylic esters as the monounsaturated monomers, alkyl esters can be effectively employed as precipitants. Typical esters include n-hexyl acetate, 2-ethylhexyl acetate, methyl oleate, dibutyl sebacate, dibutyl adipate and dibutyl carbonate. The esters must have a carbon atom content of at least 7. The concentrations required will vary somewhat with the ester being used and with the amount of cross-linking monomer but from 30% to 50% by weight based on the combined weight of the monomers and the precipitant will generally cause the desired phase separation and the formation of a MR structure within the polymerized mass.

Higher aliphatic hydrocarbons containing at least 7 carbon atoms, such as heptane and isooctane, may be employed as precipitants when employing acrylic esters as the monoethylenically unsaturated monomers. The amounts employed can be varied from 25% to 50% based on the combined weight of monomers and precipitant.

Many polymerization methods can be used in preparing the macroreticular resins and the hybrid resins as well. The preferred method, however, is suspension polymerization. In this case, an additional factor must be considered, namely, the solubility, i.e., miscibility of the precipitant in the suspending medium. Since suspension polymerization of most ethylenically unsaturated monomers is generally conducted in aqueous media, most frequently it is the water-solubility of the precipitant which must be considered. While precipitants with water-solubilities as high as 20 grams per 100 grams of water can be employed, a low water-solubility is preferred because of handling ease, ease of recovery, and processing economies. As is well known, however, it is possible to decrease the water-solubilities of compounds by adding salts to the aqueous phase and this method also may be employed to decrease the water-solubilities of a precipitant liquid. The general position is that, when suspension polymerization is used, the precipitant must be either immiscible or only partially miscible with the suspending medium.

Other suitable methods for preparation of the macroreticular resins are disclosed in U.S. Pat. Nos. 3,275,548 and 3,357,158.

As noted hereinabove the terms "hybrid copolymers" or "hybrid resins" have been coined to denote materials obtained by a multi-stage polymerization technique. The term hybrid resins or hybrid ion-exchange resins generally refers to the hybrid copolymers in their converted or functionalized form, i.e., after treatment of the hybrid copolymers to introduce suitable ion-exchange functional groups or after incorporating functionalized monomers. The same materials, catalysts, proportions and polymerization techniques, particularly the suspension polymerization technique, referred to above with reference to the precursor MR copolymers and the gel-type copolymers are used in making the finished hybrid copolymers or hybrid resins. The hybrid ion-exchange resins useful in the process of the present invention, in which the pores of the MR copolymer are filled with a lightly cross-linked guest copolymer, do in fact combine the high capacity of the gel resin with the stability of the MR resin. The hybrid copolymer is prepared by adding fresh monomer such as, for example, styrene, catalyst, and a suitable cross-linking agent such as divinylbenzene to a suspension of a MR copolymer and water. The monomer is adsorbed or imbibed into the pores of the MR copolymer, and the imbibed monomer is polymerized within the MR copolymer beads by heating the mixture and thereafter ion exchange functional groups are introduced to the polymer complex thus formed. Not only do the resulting resins show a greater combination of capacity and stability than one obtains with a MR resin and a gel resin, but also there are significant improvements in leakage and pressure drop over the corresponding MR and gel type resins. The monomer which is to be sorbed or imbibed into the base MR copolymer, herein designated as the guest monomer merely for ease of reference, is deposited within the pores of the substrate and no interaction with the substrate is sought although some interaction would not necessarily be harmful or undesirable. In any event, the final compositions are still heterogeneous. Thus, while some swelling on the polymer body cannot be excluded, no groups or treatments promoting grafting efficiency are generally provided or even deemed necessary. The hybrid resins may be considered heterogeneous products characterized by two relatively independent phases which cooperate in providing superior thermal capacity, and particle stability.

The relative amounts of guest polymer and MR host or base copolymer can be varied over a wide range. It is desirable, however, to use at least 50 parts by weight of guest copolymer per 100 parts by weight of MR base or host polymer, with the maximum amount being dictated by that amount which can be imbided or retained in or on the MR base structure. This maximum will ordinarily be about 300 parts by weight of guest copolymer per 100 parts by weight of base polymer, although higher amounts can also be used. Preferably, the amounts of guest copolymer to MR base will be in the range of about 100 to 200 parts of guest copolymer per 100 parts of MR polymer.

The following examples will further illustrate the invention but are not intended to limit it. In the examples, as well as in the other parts of the specification and claims, parts and percentages are by weight unless otherwise stated. Mesh measurements are U.S. Standard Sieve unless otherwise stated. All chemicals used are of good commercial quality. In the case of divinylbenzene (DVB) a good commercial grade is used which contains about 56% active material, i.e., pure DVB, the balance being essentially all ethyl vinyl benzene. The copolymers set forth below are in bead form and are prepared by suspension or pearl polymerization techniques. Porosity is reported as percent porosity or as the volume of pores per dry volume of resin, usually as milliliter per milliliter (ml./ml.). Percent porosity can be obtained by multiplying this value by 100. All temperatures given in the examples are in ° C. unless otherwise stated.

The thermal load capacity evaluations are carried out using 15 ml. of wet resin packed in a 0.5 inch I.D. jacketed glass column. The loading temperature is maintained at room temperature (23° – 25° C.) while the regeneration temperature is maintained by feeding water to the jacketed column at 90° – 95° C so that the water coming from the jacket was 80° – 85° C. The flow rate is maintained at 0.5 gal/minute/cu.ft. for both the loading and the regenerating portion of the cycle. The thermal load capacity is calculated in meq of salt per ml. of resin. Duplicating the experiments but varying the flow rates from 0.5 gal/min/cu.ft. to 2.0 gal/min/cu.ft. shows that the thermal capacity was not affected by the flow rate.

An evaluation to determine the effect of varying the weak acid to weak base ratio of the hybrid resins was conducted with the following results. Hybrid resin A is prepared according to the procedure of Process I and resins B – J are analogous to resin A, differing only in filling ratios or crosslinker contents.

Table I

| Hybrid Resin | Ratio CEC/AEC Capacity | Weak Acid meq./g. | Weak Base meq./g. | Thermal Capacity meq./ml. |
|---|---|---|---|---|
| A | 0.92 | 2.37 | 2.58 | 0.044 |
| B | 1.08 | 2.56 | 2.36 | 0.088 |
| C | 1.21 | 3.18 | 2.63 | 0.071 |
| D | 2.32 | 4.57 | 1.97 | 0.078 |
| F | 4.10 | 5.37 | 1.31 | 0.074 |

An evaluation to determine the effects of percentage crosslinker in the loading phase gave the following results as shown in Table II.

Table II

| Hybrid Resin | % DVB | Thermal Capacity meq./ml. |
|---|---|---|
| G | 1 | 0.050 |
| H | 2 | 0.043 |
| I | 3 | 0.074 |
| J | 4 | 0.026 |

Table III

HYBRID RESINS: CORRELATION OF FILLING LEVEL RATIO WITH THERMAL LOAD SALT CAPACITY

| Resin No. | Process | Filling Ratio guest : host polymer | Thermal Load Salt Capacity meq/ml of resin | Cation Exchange Capacity meq/g | Weak Base Capacity meq/g | Total Anion Exchange Capacity meq/g | pH | Influent ppm |
|---|---|---|---|---|---|---|---|---|
| 1 | IV | 0.61 | .012 | 2.58 | 2.8 | 3.30 | 5 | 500 |
| 2 | IV | 0.82 | 0.23 | 2.77 | 2.83 | 3.21 | 5 | 500 |
| 3 | I | 0.92 | .044 | 2.37 | 2.58 | — | 5 | 500 |
| 4 | I | 1.02 | .052 | 3.69 | 2.10 | 2.72 | 5 | 500 |
| 5 | II$^{(1)}$ | 1.29 | .073 | 4.41 | 2.30 | 2.82 | 5 | 500 |
| 6 | I$^{(11)}$ | 1.31 | .065 | 4.70 | 1.88 | 2.59 | 5 | 500 |
| 7 * | I | 1.54 | .095 | 4.78 | 2.07 | 2.89 | 5 | 500 |
| 8 | II$^{(111)}$ | 1.71 | .100 | — | — | — | 5 | 500 |
| 9 | II$^{(111)}$ | 1.71 | .097 | — | — | — | 5 | 500 |
| 10 | IV | 1.82 | .099 | 5.26 | 1.96 | 2.47 | 5 | 500 |
| 11 | I | 1.97 | .070 | 6.11 | 1.45 | 1.92 | 5 | 500 |
| 12 | IV | 2.51 | .019 | 6.38 | 0.78 | 0.97 | 5 | 500 |

$^{(1)}$ Extender at 40% by weight
$^{(11)}$ Procedure of I including DEGDVE
$^{(111)}$ Extender of 10% by weight
* Resin 7 influent was tested with different influent concentrations and showed a 500 ppm influent resulted in a 66 ppm effluent; a 200 ppm influent resulted in a 19 ppm effluent and a 1200 ppm influent resulted in a 570 ppm effluent.

Although the process of the invention is best conducted with influent liquids having a pH ranging from 5 – 7, such a pH should not be considered a limiting factor. For example, pH's outside of this range may also desalinate liquids.

As has been shown, the filling level of guest polymer liquid into the MR host polymer affects the capacity of the final resins and in general it should be understood that the higher the ratio of cation exchange capacity (CEC) to anion exchange capacity (AEC) will allow effective performance at relatively low pH's. Similarly, a ratio of anion exchange to cation exchange capacity of 1 or lower will allow effective desalination at relatively high pH's. Further illustration of the relationship between thermal load capacity and filling levels may be found in Table III. The process is particularly useful for removing sodium chloride from liquids but should not be understood to be limited to the mere removal of sodium chloride since it has utility in removing any metal salt although a preferred embodiment is the removal of monovalent metal salts. Preferred processes also include the use of resins having a crosslinking system such as DVB and diethyleneglycoldivinylether as opposed to resins containing a single crosslinker such as DVB alone. The following procedures illustrate four different preferred processes for preparing hybrid resins. Process V illustrates the preparation of a vinylbenzylchloride based resin.

PROCESS I — SYNTHESIS OF RESIN A

A 3-necked round bottom flask equipped with stirrer, condenser and thermometer is charged with 600 g. of $H_2O$ and 150 g. of MR styrene — DVB copolymer (4% DVB) available from Rohm and Haas Company as Amberlite XE-305. To the stirred reaction mixture is then added over an 8 minute period, a solution containing 94.5 g. of methyl acrylate, 5.5 g. of 54.9% active DVB and 4 g. of benzoyl peroxide. The resultant mixture is stirred 30 minutes and then heated to 70° C. for 20 hours. After cooling and filtering the beads, the latter is washed 4 times with 500 cc of methanol and subsequently is dried to afford 242.4 g. of white spherical hybrid beads. The dried beads are subsequently heated at 60° C. with 1250 cc of ethylene dichloride (EDC) for 16 hours. The EDC is filtered off and the beads are washed once with 1 liter of EDC and twice with 500 cc of methanol. After drying, the beads weigh 207.2 g.

50 g. of the EDC washed and dried resin from above is swelled with 120 cc of EDC and 94.2 g. of chloromethyl ether (CME) for 1 hour at room temperature in a 3-necked round bottom flask equipped with stirrer, thermometer, reflux condenser and drying tube. This slurry is then cooled to 0° C. and a solution of 63.9 g. of Al $Cl_3$ in 50.7 g. of CME is added to it with agitation over a 2 hour period with the temperature maintained at 0° C. The resultant mixture is stirred at 0° C. for three hours and subsequently added to 300 ml of methanol at 5° – 10° C slowly so the temperature of the methanol solution does not exceed 25° C. The methanol is siphoned from the beads and the beads washed three times with an equal volume of water. The beads are diluted with water, neutralized with 0.5 g. of $Na_2CO_3$ and filtered to afford 111 g. of wet beads (60% solids) containing 16.81% chlorine after drying.

The wet chloromethylated beads from above are diluted with water and heated to azeotrope off EDC. The beads are filtered and diluted with 60 cc of water in a 500 ml 3-necked round bottom flask equipped with a stirrer, thermometer and dry ice condenser. To this stirred mixture is added 60 g. of 50% NaOH and 169 g. of 40% aqueous dimethylamine. The mixture is heated to reflux (56° C.) over ½ hour and held at influx for four hours.

The dry ice condenser is replaced with a distillation condenser and the excess dimethyl amine is stripped off until the reaction mixture reaches 104° C. The subsequent mixture is refluxed for two hours and cooled to room temperature. The resin is then washed with water until the pH of the effluent is less than 8. The wet yield of beads is 131.6 g. (52 – 61% solids). A sample of the dried resin contains 1.7% Cl and 4.6% Na and an AEC of 2.58 meq./g. and a CEC of 2.37 meq./g.

PROCESS II

This process is identical to process I above except that the organic phase is diluted with an extender such as DIBK (di-isobutyl ketone) before adding the organic phase, the Amberlite XE-305 and water slurry. Normally, the DIBK constitutes ca 10% of the organic phase by weight. Normally, only about 90% of the total monomer charge (MA, DVB, DEGDVE) is incorporated into the final dry product giving a net hybrid yield of ca 92 – 95%.* The DIBK is steam stripped from the batch prior to cooling and washing the product.

*The 92 – 95% yield is typical of lauryl peroxide catalyzed polymerization. 98 – 100% yields are subsequently obtained with benzoyl peroxide as catalyst.

PROCESS III

This process consists of first preparing a (28% Triton X-100/water) solution. Triton X-100 is a Rohm and Haas non-ionic surfactant. To this stirred solution is then added the organic phase containing methyl acrylate, catalyst and crosslinking agents. After vigorous stirring to form a relatively stable emulsion, dry Amberlite XE-305 is added and stirred in the emulsion for ca 30 – 60 minutes. At the end of this time, the agitation is stopped and the excess emulsion filtered or siphoned from the beads. The beads are then suspended in salt solution and heated with stirring to 55° – 70° C. for 6 – 24 hours to polymerize the monomer mix incorporated into the beads. The batch is then heated to 95° C. for ca two hours to insure complete polymerization. The beads were subsequently cooled, filtered, washed, and dried to afford the final hybrid copolymer. The amount of emulsion incorporation into the beads is not reproducible from batch to batch, prior to removal of the excess emulsion. Hence, the amount of monomer mix incorporated into the final copolymer bead varied widely batch to batch.

PROCESS IV

This process differed from Process III in that the excess emulsion is not filtered from the batch. Instead, saturated sodium chloride solution is added to the batch to break the original emulsion. The de-emulsified monomer outide the beads is then rapidly absorbed into the Amberlite XE-305 beads. The resultant batch is either heated directly to polymerize the monomer or is just filtered to remove the salt solution and re-diluted with fresh salt solution prior to heating. Processing is then continued as described for Process III. This process has the advantage over Process III in that all of the organic phase (monomer mix) initially charged to the reactor to form the emulsion subsequently ends up incorporated into the Amberlite XE-305 beads and final hybrid copolymer.

PROCEDURE V

Synthesis of Resin based on vinylbenzylchloride (VBC)

A VBC-6% DVB-40% MIBC copolymer is prepared using a suspension polymerization technique. The copolymer is then filled with monomer mix using a process as follows. Nineteen g. of Triton X-200 and 120 ml $H_2O$ is charged to a 2-liter reaction flask equipped with a mechanical stirrer, thermometer, reflux condenser, and a heating mantle, and is stirred virorously for 15 minutes. Monomer mix consisting of 190.0 g. ethyl acrylate, 8.2 g. DVB (55.9%), 1.6 g. DEGDVE, and 4.0 g. AIBN, is then added and the mixture is stirred for 15 minutes. An additional 333.3 ml. of $H_2O$ is added and the mixture is stirred for 15 minutes. The VBC copolymer is then added and the slurry stirred for 1 hour. One hundred ml of saturated NaCl solution is then added over a 5 minute period, the mixture is stirred for 15 minutes and is then heated to 75° over 1 hour and is held at 75° for 20 hours. The reaction mixture is then heated to 95°, held at 95° for 2 hours, cooled and washed. The yield, based on dry resin, is 282 g., indicating 85% incorporation of monomer. The resin is then treated with 300 ml $H_2O$, 400 ml NaOH (50%) and 635 ml DMA (40%) and refluxed at 45° for 4 hours. The excess DMA is then distilled off, the flask is heated to 105° and held at 105° for two hours. The reaction mixture is then cooled, and the resin washed until effluent is neutral. The resin is evaluated and has a thermal salt capacity of 56.7 mg/15 ml of resin at pH = 5.0

PROCEDURE VI

1. Preparation of Styrene/Divinyl Benzene (DVB) Hybrid Copolymer Containing Dimethyl Itaconate (DMI)

The hybrib copolymer was prepared by the following procedure. Styrene/DVB (100 g.) and 400 g. tap water were introduced into a 1 liter, 3-necked flask fitted with mechanical stirrer, reflux condenser, $N_2$ inlet tube, thermometer, heating mantle, and thermowatch assembly. To the flask was added a premixed solution of 173.96 g. (DMI), 7.62 g. DVB (53.9% assay), 1.31 g. diethylene glycol divinyl ether (DEGDVE), 20.27 g. diisobutyl ketone (DIBK), and 3.6 g. lauroyl peroxide over a period of ¼ hour with stirring. The stirring was continued for an additional ½ hour followed by heating the mixture to 60° C for 20 hours. After azeotropic distillation of the DIBK, the copolymer was isolated, washed with water, and oven dried, yield was 243.6 g. (86.2%).

2. Chloromethylation Procedure

The hybrid copolymer was chloromethylated in a 2 liter, 3-necked flask equipped with mechanical stirrer, reflux condenser, thermometer, and external cooling bath. The hybrid copolymer (143.6 g.), 999 ml ethylene dichloride (EDC), and 746 g. of chloromethyl ether (CME) were stirred in the flask for 2 hours, cooled to 0°–5° C, and 332 g. of $AlCl_3$ added incrementally over a 2 hour period while maintaining the temperature at 0°–10° C. Upon completion of the $AlCl_3$ addition, the temperature was raised to 25° C and held for 3 hours. The reaction was quenched by pouring into 1 liter of chilled methanol while maintaining the temperature below 35° C. The mixture was stirred 15 minutes, stick filtered, and the resin washed with 1 liter of methanol. Removal of the methanol from the resin was followed by the addition of 1 liter of DI water and addition of 50% NaOH to make the solution basic. After heating to 100° C for 15–20 minutes, the solution was cooled and stick filtered. An analytical sample of the resin contained 14.78% Cl.

3. Aminolysis-Hydrolysis of the Chloromethylated Hybrid Copolymer

The entire chloromethylated hybrid copolymer sample was placed in a 2 liter, 3-necked flask fitted with mechanical stirrer, thermometer, dry ice condenser, and heating mantel. To the flask was added 120 g. cracked ice, 120 g. of 50% NaOH, and 338 g. of 40% dimethylamine (DMA). The mixture was stirred at ambient temperature for 1 hour, then heated to reflux for 4 hours and finally to ~100° C for 2 hours to remove the excess DMA (dry ice condenser replaced with water cooled condenser for this last step). The product was isolated, washed with water, and stored wet. Analysis gave 9.9% Cl and 4.5% N. General properties of the resin were measured as 49.41% solids, 3.10 meq/g. total anion exchange capacity (TAEC), and 1.52 meq/g. cation exchange capacity (CEC). Thermal salt capacities (mg NaCl/15 cc.) were measured at pH 6–8 using a 540 ppm NaCl solution. Measured values were 46.61 (pH 6), 77.81 (pH 7), and 43.95 (pH 8).

We claim:

1. A method for desalinating liquids containing metal salts which comprises:
   (a) contacting such liquids with a mass or bed of thermally regenerable hybrid ion exchange resin to adsorb metal salts, said hybrid ion exchange resin being an intraparticulate heterogeneous product having two relatively independent and separate polymer phases wherein the pores of a preformed crosslinked macroreticular host polymer phase are at least partially filled with a second crosslinked guest polymer phase, with the separate phases having differing ion exchange functionality, and
   (b) regenerating the hybrid resin by elution with an aqueous liquid at a temperature greater than that of the liquid at time of contact with the resin.

2. A method as claimed in claim 1 wherein the hybrid resin comprises a host polymer having weak base functionality and a guest polymer having weak acid functionality.

3. A method as claimed in claim 2 wherein the host polymer is macroreticular in nature and the guest polymer is gellular in nature.

4. The method as claimed in claim 3 wherein the hybrid exchange resin comprises an amount of guest polymer ranging from 50 – 300 parts by weight per 100 parts by weight of macroreticular host polymer.

5. A method as claimed in claim 2 wherein the host polymer is derived from a vinyl benzyl chloride monomer.

6. A method as claimed in claim 2 wherein the guest polymer is aliphatic.

7. A method as claimed in claim 2 wherein the guest polymer is derived from dimethyl itaconate.

8. A method as claimed in claim 2 wherein the hybrid resin is derived from a styrene/divinylbenzene macroreticular host copolymer containing a polymerized dimethyl itaconate/divinylbenzene mixture.

9. A method as claimed in claim 8 wherein the dimethyl itaconate/divinylbenzene mixture additionally contains diethylene glycol divinyl ether.

10. A method as claimed in claim 2 wherein the liquids are industrial feed waters.

11. The method as claimed in claim 2 wherein the liquids are home waters.

12. The method as claimed in claim 2 wherein the liquids are brackish waters.

13. A method as claimed in claim 1 wherein the hybrid resin is derived from a styrene/divinylbenzene macroreticular host copolymer containing a polymerized methylacrylate DVB mixture.

14. A method as claimed in claim 1 wherein the liquids contain monovalent metal salts.

15. A method as claimed in claim 1 wherein the liquid contains sodium chloride.

16. A method as claimed in claim 1 wherein the aqueous regenerating liquid is deionized water.

17. A method as claimed in claim 1 wherein the aqueous regenerant liquid is a saline solution.

* * * * *